United States Patent [19]

Kuzmak et al.

[11] 4,200,782
[45] Apr. 29, 1980

[54] METHOD AND DEVICE FOR REGULATING PARAMETERS OF THERMAL CYCLES IN ELECTROSLAG WELDING

[75] Inventors: Evsei M. Kuzmak; Nikolai N. Koshelev, both of Moscow; Anas N. Khakimov, Zhukovsky Moskovskoi; Tamara V. Yashunskaya, Moscow; Ljubov A. Efimenko, Poselok Gazoprovod Moskovskoi; Mark S. Skuditsky, Moscow; Semen A. Zandberg-Berger, Volograd; Grigory I. Bublki, Volograd; Lev M. Bronshtein, Volograd, all of U.S.S.R.

[73] Assignee: Moskovsky Institut Neftekhimicheskoi I Gazovoi Promyshlennosti Imeni I.M. Gubkina, Moscow, U.S.S.R.

[21] Appl. No.: 838,234

[22] Filed: Sep. 30, 1977

Related U.S. Application Data

[63] Continuation of Ser. No. 634,323, Nov. 21, 1975, abandoned.

[51] Int. Cl.² ............................................. B23K 9/18
[52] U.S. Cl. ........................... 219/73.1; 219/137 R; 219/126; 228/46; 228/222
[58] Field of Search .............. 164/52, 252; 219/73 R, 219/73.1, 73.21, 73.11, 126, 127, 137 R; 228/46, 50, 222

[56] References Cited

U.S. PATENT DOCUMENTS

| 3,046,386 | 7/1962 | Wooding et al. | 219/126 |
| 3,171,013 | 2/1965 | Danhier | 219/137 |
| 3,281,570 | 10/1966 | Wooding | 219/126 |
| 3,296,412 | 1/1967 | Waite et al. | 219/73.1 |
| 3,436,520 | 4/1969 | Anders et al. | 219/126 |
| 3,660,629 | 5/1972 | Nakai et al. | 219/73.1 |
| 3,773,260 | 11/1973 | Kunioka et al. | 239/10 |
| 3,858,865 | 1/1975 | Maedu | 219/126 |
| 3,948,428 | 4/1976 | Bonomo et al. | 219/73 R |

FOREIGN PATENT DOCUMENTS 2024404 11/1971 Fed. Rep. of Germany.

OTHER PUBLICATIONS

K-F-Konstruktion und Fertigung, VDI-Z 112 (Nov.) 1970.

Primary Examiner—Bruce A. Reynolds
Assistant Examiner—M. Paschall
Attorney, Agent, or Firm—Haseltine, Lake & Waters

[57] ABSTRACT

A method for regulating the parameters of thermal cycles in electroslag welding in which the entire area of the zone affected by heating is cooled. The area is limited by isotherms of maximum heating temperatures within an interval from temperatures close to the melting temperature point up to a temperature $A_1$. The cooling is effected so that the cooling rate would increase in the direction of movement away from the area heated up to the melting point towards the area heated up to the temperature $A_1$. The device for realizing the method of regulating the parameters of thermal cycles has jets secured on the side and bottom faces of the slide block, with outlet spraying nozzles for the jets located such that the cooling medium flowing out from those nozzles would cool the entire surface of the metal of the seam and the zone subject to heating effect the surface is limited by the isotherms of maximum heating temperatures within an interval from the melting point up to the temperature $A_1$.

5 Claims, 12 Drawing Figures

METHOD AND DEVICE FOR REGULATING PARAMETERS OF THERMAL CYCLES IN ELECTROSLAG WELDING

This is a continuation of application Ser. No. 634,323 filed Nov. 21, 1975 now abandoned.

BACKGROUND OF THE INVENTION

The present invention relates to a welding technique and particularly to a method for regulating the parameters of thermal cycles in electroslag welding.

The present invention may be broadly utilized in welding thick-walled structures.

Its most favorable utilization is for making welded structures from low-alloy normalized and thermally strengthened steels intended for use at subzero temperatures.

At the present time, the electroslag welding technique is widely employed for making structures of large thickness.

Under the conditions of the electroslag process, liberation of heat takes place when an electric current passes through the slag bath. This heat is used for the melting of the welding electrode, edges of an article being welded and flux. This entails loss of a considerable amount of heat. The loss of heat results from heat dissipation in the mass of the article being welded, slide blocks, and heat radiation from the slag bath surface. A larger portion of the thermal balance of the electroslag process (50%) is caused by the heat absorbed by the mass of the article being welded. In this connection the electroslag process is accompanied by retarded heating and cooling of the metal of articles being welded as well as with its being heated above the full re-crystallization temperature $A_3$ for prolonged periods of time. This promotes development of substantial structural heterogeneity of welded joints. An adverse change of mechanical properties is manifested in a decreased resistance to brittle failure, and for thermally strengthened steels, additionally in a loss of strength.

Due to above mentioned facts, the area of application of the electroslag process is limited in welding structures intended for use at above zero temperatures, or those subject to subsequent high-temperature thermal treatment-normalizing.

Normalizing is aimed at improving the structure and mechanical properties of welded joints.

Realization of thermal treatment of this kind requires application of special heating devices. For example furnaces of substantial dimensions, and is prolonging of the production process. This makes the production of welded structures more expensive.

In a number of cases, normalizing may cause intolerable deformations and this makes its realization impossible. Therefore a full number of welded structures have to be produced by using less productive welding methods, such as automatic multilayer submerged arc welding.

Electroslag welding of thermally strengthened steels is accompanied with a particularly unfavorable reaction to the thermal cycle of welding. Along with a reduced resistance to brittle failure, weakening of welded joints is observed. Subsequent normalizing of such joints is not possible, because heating above the tempering temperature of the base metal at thermal strengthening is not feasible. Therefore, up to the recent time electroslag welding was not used for producing structures from thermally strengthened steels.

The required properties of welded joints in thermally strengthened steels were obtained by way of reducing the heat input of arc welding methods. This made the welding process more complicated because of an increased number of welding seams.

By regulating (reducing) the heat input of automatic submerged arc welding it is possible to a certain extent to influence the most important parameters of the thermal cycle of welding, heating rate, duration of keeping steel at higher than preset temperatures, and cooling rate. Consequently introducing favorable changes in the properties of welded joints.

In electroslag welding it is practically impossible to regulate the thermal cycle parameters by altering the welding conditions.

Up to now a number of methods have been proposed for improving the electroslag welding process with the aim of reducing negative influences on the properties of welded joints.

There is a known method of electroslag welding in which the electroslag welding is followed by local or total normalizing of welded joints, performed for the purpose of making them uniformly strong. However, in a number of cases, especially in structures made from low-alloy thermally strengthened steels, realization of high-temperature thermal treatment is impossible.

Also known is an electroslag welding method for regulating the thermal cycle by way of accompanying cooling.

According to this method in the course of electroslag welding, a welded joint is cool by means of a special device consisting of a seam forming slide block whose bottom portion has several rows of holes for the delivery of cooling medium.

As a result, the regulation of thermal cycle parameters and consequently that of the welded joint properties is possible only during the stage of cooling, from the minimum temperature of 950° C., after heated metal appears from under the slide blocks. Actually, only one parameter of the thermal cycle is being regulated that is a cooling rate. Therefore, this method and device have the following disadvantages: (1) it fails to regulate thermal cycle parameters at the heating stage (heating rate Wh and t'—the duration of keeping heated metal at a temperature higher than $A_3$):(2) increased intensity of heat dissipation from the welded joint. A higher rate of cooling the joint is possible only after the heated metal appears from under the seam forming slide blocks. Parameter t"—the duration of time the heated metal is kept at a temperature higher than $A_3$ also remains non-regulated during cooling. These disadvantages lead to a situation where the total duration ($t = t' + t''$) of keeping the heated metal at a temperature higher than $A_3$ is not changed substantially when applying the known welding method as compared with conventional electroslag process technique, because t' and t'' remain actually unchanged.

This leads to an intensive growth of the austenite grain with a resultant reduction in resilience especially of the seam metal and that of the seam-adjacent section of the thermal influence zone.

The above mentioned device is also not able to regulate the welding thermal cycle parameters pertaining to the separate sections of the thermal influence zone and of differentiating the cooling rate into temperature intervals within the given sections of the thermal influence zone. This disadvantage is particularly detrimental for thermally strengthened steels.

There are other methods of electroslag welding, which along with further improvements for better quality of welded joints also provide for higher productivity of the welding process.

Worthy of noting among these improvements are the reduction of the welding gap, the additional introduction of powdery adding material into the slag bath, higher welding electrode feeding speed, the additional heating of the electrode from a self-contained electric current source, the regulation of heat distribution and temperature in the slag bath, and the application of 5 mm diameter welding wire in welding process.

The above improvements, although speeding up the welding rate 1.5-2 times promote proportional reduction in the amount of heat brought to the welded joint. However, the heat input at doubling the welding speed as compared with the conventional technique still remains at a high level. Due to this fact, application of the above improvements in the electroslag welding would not be able to change the thermal cycle parameters within the limits approximate to an optimum level to ensure structural and mechanical uniformity of welded joints.

The object of the present invention is to eliminate the above disadvantages.

Other objects of the invention are to improve the metal structure in the seam and in the thermal influence zone, and production of practically equal mechanical properties of the welded joint and base metal.

Another object of the invention is opening a way for the possible application of the electroslag process for welding thermally strengthened steels.

Among other objects of the present invention that should be noted is a possibility of doing away with subsequent normalizing of welded joints.

The present invention has as its aim a method for regulating the parameters of the thermal cycle in electroslag welding. This would ensure practically equal properties of metal on the seam and in the thermal influence zone of the welded joints and base metal.

This task is accomplished by a method for regulating the parameters of the thermal cycles in electroslag welding. In this invention, the entire area of sections of the thermally influenced zone are simultaneously. The area is limited by the isotherms of maximum heating temperatures within an interval from temperatures close to the melting temperature up to austenite transformation temperature $A_1$. The cooling is effected so that the cooling rate increases in the direction moving away from the sections with maximum heating temperatures close to the melting temperature towards sections with maximum temperature $A_1$.

The thus proposed method for regulating parameters of thermal cycles in electroslag welding provides:

desired thermal cycle parameters during heating and cooling, viz., cooling and heating rates and the time during which the metal is subjected to a temperature higher than the heating temperature $A_3$ and the extent of time that the metal will remain at temperatures higher than heating temperature $A_3$;

higher degree of structural and mechanical uniformity of metal in the seam and the thermal influence zone and base metal.

The given method makes it possible to do away with subsequent normalizing of welded joints made by way of the electroslag process.

A further possibility arises for replacing the automatic multilayer submerged arc welding with the elctroslag process featuring regulation of thermal cycles.

Reduction in the number of seams made, as compared with multilayer welding, improves technical and economic characteristics of the production of welded structures.

Introduction of the electroslag welding technique, with regulation of thermal cycles, into the production of gas and petrochemical equipment permits an increase of three to four times productivity of the welding process. There is also a reduction in the number of weld seam defects from 12 to 3%.

The portions of the heated zone which have an identical maximum heating temperature, should preferalby be cooled in the temperature range of liberation of structurally free ferrite at a rate calculated to suppress such liberation, and in the temperature range of minimal austenite stability at a rate calculated to permit the austenite to disintegrate into desired structural components.

This assists in reducing the content of low-strength ferrite phase in the welded joint structure and in increasing the welded joint strength. Disintegration of austenite in the given area contributes to obtaining the required mechanical properties of welded joints: resilience, strength characteristics, etc.

Various rates of cooling the sections of metal at a seam and a zone subject to the heating effect are obtained by subjecting them to the effects of mediums with different heat transfer (heat-exchange) coefficients or by altering the cooling medium flow rate.

This allows the predetermined relationship to exist between the absolute values of the cooling rates. This has the purpose of creating austenite disintegration products similar in composition at the cooling stage in accordance with the welding thermal cycle.

For the purpose of carrying the above described welding method into effect there is a special device. The device is comprised of a welding seam forming a slide block with passages for the delivery of a cooling medium. The slide block is connected with a drive for its progressive motion and carries jets that have passages for the delivery of a cooling medium. It also has spray nozzles for the delivery of a cooling medium onto the sections of the welding seam and a zone subject to the heating effect. According to the invention, the jets are secured on both side faces of the slide block, while the outlet nozzles of the jets are so constructed that the cooling medium flowing out from these nozzles would cool down the entire surface at the metal of seam and a zone subject to the heating effect. The surface is thus limited by isotherms of maximum heating temperatures within an interval from temperatures close to the melting temperature up to temperature $A_1$.

This brings about the optimization of the most important parameters of the heating and cooling stages. These thermal cycles are in electroslag welding (heating and cooling rates, duration of keeping at a temperature higher than temperature $A_3$ when heating and cooling) for the purpose of gaining the maximum structural and mechanical uniformity of welded joints with respect to the base metal in the course of welding.

It is necessary to provide the side and bottom faces of the slide block with bosses having passages permitting the flow of a cooling medium. The flow comes in from the slide block into the jets; intended for attaching the jets.

This opens the way for interconnecting the cooling medium delivery passages in the slide block and in the jets and in addition feeds the jets with cooling medium. For example water, after it has passed through the slide blocks, increases in temperature and this aids in the arrangement of the variable cooling rate in the section of a zone subject to the heating effect.

BRIEF DESCRIPTION OF THE DRAWINGS

The invention will be better understood from the following description of its actual embodiment with references to the accompanying drawings, in which.

DESCRIPTION OF THE PREFERRED EMBODIMENT

The regulation of the thermal cycle parameters in electroslag welding, according to the invention, is carried out at the expense of an intensive dissipation of heat from the metal of a zone subject to the heating effect and of the welding seam directly in the course of its heating or cooling. The regulation of the heat dissipation rate and/or intensity is performed in such a way that the cooling rate curve 1 in FIG. 1) increase as the maximum heating temperature is reduced (curve 2).

Figure 1:
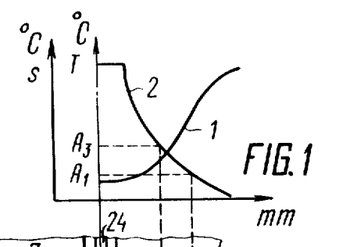
FIG. 1 presents curves of the maximum heating temperature and cooling rate distribution along the zone subject to the heating effect. This is cahracteristic of the method of regulating the thermal cycle parameters in the course of electroslag welding when the welding seam is formed by two slide blocks.

FIG. 1 gives a graph of varying the cooling rate (curve 1) with respect to the distance from the axis of a welding seam 3 (FIG. 2), and a graph of varying the maximum heating temperature (curve 2) with respect to the distance from the axis of the welding seam 3. Here, the X-axis plots the distance from the axis of the welding seam 3 in mm, while the Y-axis plots the temperature in °C. and the cooling rate in deg/s. Letter T designates the melting temperature of a base metal 4.

The required value of the welded joint cooled area are determined by an isotherm 5 (FIG. 2) of the maximum heating temperatures equal to temperature $A_1$.

Temperature $A_1$ corresponds to an austenite-perlite transformation.

Figures 2, 3:
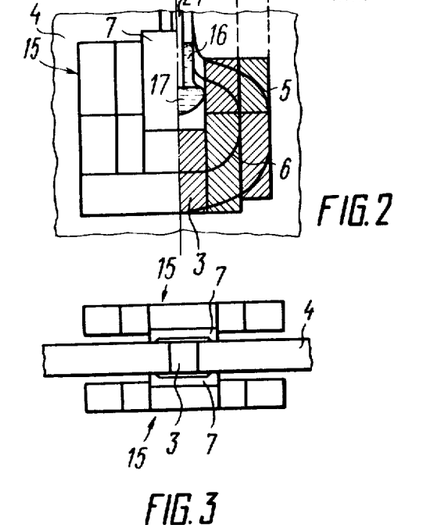
FIG. 2 is a front schematic view showing the relative positions of the edges of two articles being welded, with slide blocks and jets. This is done according to the invention, such that the welding seam is formed by two slide blocks.
FIG. 3 is a top schematic view showing the relative positions of the edges of two articles being welded, with slide blocks and jets. This is done according to the invention, such that the welding seam is formed by two slide blocks.

The position of the isotherm 5 relative to the base metal 4 of an article being welded may be determined by any known method permitting temperature recording (for example with the help of a thermocouple cooperating with an oscillograph, thermopencils, etc.). The limitation of the cooling zone by the isotherm 5 of maximum temperatures corresponding to temperature $A_1$ is explained by the fact that it is directly in the zone subject to the heating effect. When the maximum heating temperature occur within the range of temperatures $T-A_1$, the most unfavourable changes in the structure and properties of steels take place.

By varying the parameters of the thermal cycle during heating, the degree to which the carbide phase is dissolved in the austenite and the degree to which the latter is homogenized can be controlled to obtain, on cooling, finely dispersed products of austenitic disintegration of homogeneous composition.

A non-uniform welding temperature field or a polymorphic transformation in steel can lead to the following situation. Within a welded joint zone subject to the heating effect there are distinguished at least two sections with characteristic properties: complete and incomplete re-crystallization.

The complete re-crystallization section, (limited by an isotherm 6 of maximum temperature $A_3$) especially at a temperature higher than the temperature at which the intensive growing of austenite grains is initiated, exhibits the most clearly defined change in the base metal structure and its properties. They are manifest in reducing plasticity and resilience due to the growing of grains, overheating, full or partial hardening, formation of cold cracks, etc. The temperature corresponds to the beginning of the ferrite falling out of the austenite at cooling, or to the end of the ferrite dissolving in the austenite at heating.

Structural changes taking place at the incomplete re-crystallization section (limited by the isotherms 6 and 5 of maximum temperatures $A_3$ and $A_1$) can lead to a loss of strength in the welding thermal influence zone. The weakening effect observed is especially pronounced in the welding of thermally strengthened steels. The weakening disturbs the mechanical uniformity of the welded joint and loosens them. This reduces the efficiency of the thermal treatment as a means for obtaining a favourable combination of steel properties; high strength and resilience together with sufficient plasticity.

A comparison of the cooling rates of the different sections of the thermal influence zone carried out with respect to the thermally strengthened steel, shows that in order to ensure the uniform strength of the welded joint their values should be different. A reduction of the maximum heating temperature of a section of the zone subject to the heating effect shows that the cooling rate values should increase correspondingly.

For this purpose the proposed method specifies a variable rate for cooling the sections of the zone subject to the heating effect. The cooling is performed such that the cooling rate value increases proportionately to the distance moved from the sections with the maximum heating temperature near to the melting temperature towards the sections with the maximum temperature $A_1$.

For convenience in the realization of the given method, the entire zone subject to cooling has been divided into several sections cooled at various intensities. In the direction perpendicular to the axis of the welding seam 3, the zone subject to the heating effect is divided into two sections. The first of these sections is limited by the isotherms of maximum heating temperatures from the temperatures near the melting point up to temperature $A_3$. The second one is limited by isotherms of maximum temperatures between $A_3$–$A_1$. The value of the cooling rate of each section will be different in each actual case. This is so, because of the welding method which depends on the chemical composition of the welding steels and on the requirements of the mechanical properties of the welded joint, etc. The cooling rate value is determined on the basis of preliminary investigations into the weld-ability of steels by means of any method known. However, in all cases the rate of cooling the section limited by isotherms of the maximum heating temperatures between temperatures near the melting point up to temperature $A_3$ is higher than the rate of cooling the section limited by isotherms 4–3 of the maximum temperatures within the interval of $A_3$–$A_1$.

Thus, due to the use of the proposed method for the regulation of the thermal cycle parameters, disintegration of the austenite in these sections is shifted into predetermined areas of transformation. This assists in obtaining the maximum structural and mechanical uniformity of the welded joints and base metals in the course of electroslag welding.

Analysis of austenite disintegration anisothermal diagrams plotted with respect to the heating and cooling conditions characteristic of welding shows that there exists an additional reserve of regulating the properties of an actual section of the thermal influence zone. For example, the austenite disintegration anisothermal diagram, within the incomplete re-crystallization section reveals the development and liberation of a low-strength phase. This is from structurally free ferrite which in a substantial degree is associated with the phenomenon of weak thermally strengthened steel. Obviously, an increase in the rate of cooling between the temperature of the structurally free ferrite liberation up to the temperature preventing its appearance in the structure, opens the way for bringing a favorable effect on the strength properties of a weakened section.

Proceeding from there, the sections of the zone subject to the maximum heating temperatures, are cooled at a rate within the interval of minimum austenite stability temperatures.

The interval of structurally free ferrite liberation temperatures is determined by anisothermal diagrams of actual steel austenite disintegration, which are plotted with respect to the heating and cooling conditions specific for welding. The cooling rate within this interval should be such as to prevent liberation of structurally free ferrite.

The interval of austenite minimum stability temperatures is determined by the same diagrams of austenite disintegration. The cooling rate within this interval should be such as to ensure disintegration of austenite into predetermined structural components.

For example, for low-alloy steels with carbon content of approximately 0.09–0.14% the interval of austenite minimum stability temperatures comes approximately within 500°–600° C., while the recommended cooling rate in it is about 5–15 deg/s.

The values of thermal cycle parameters needed from the point of view of structural and mechanical uniformity can be secured through the use of cooling mediums which are different in their heat transfer coefficient. It is possible to use single type medium, but in this case its flow rate should be regulated.

The method used in the invention enables a favorable influence to be expected on the structure and properties not only of the zone of the base metal 4 subject to the heating effect, but also on those of the metal of, the seam 3. With this purpose in mind, provision is made for regulating the accompanying cooling of the metal of a seam 3 appearing after a slide block 7.

It is important that the structure and properties are uniform through the entire thickness of a welded joint. This is particularly significant when welding metals of high thickness. Therefore the method of the present invention proposes the possibility of double-side cooling of the base metal being welded as illustrated in FIG. 3.

Another version of the regulating of the thermal cycle parameters in electroslag welding (FIGS. 4, 5, 6) which may be most broadly utilized in welding circular butt ends of apparatus is also possible. This version applies preliminary single-side backing welding.

Figure 4:
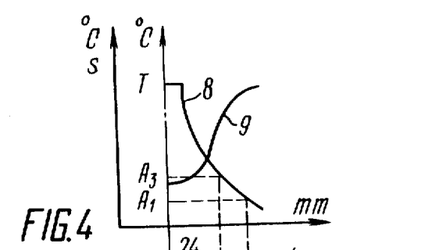
FIG. 4 presents curves of the maximum heating temperature and cooling rate distribution along the zone subject to the heating effect. This is characteristic of the method of regulating the thermal cycle parameters in the course of electroslag welding, such that the electroslag process is carried out after the preliminary single-side back welding and the seam is formed by a single slide block.
Figures 5, 6:
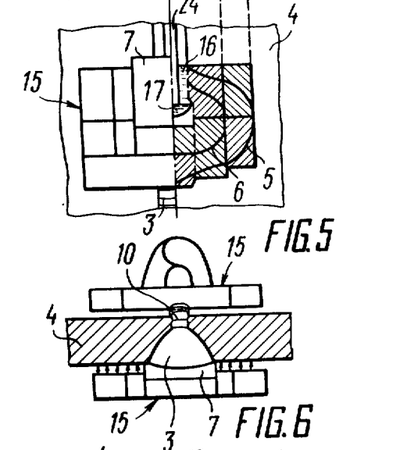
FIG. 5 is a front schematic view showing the relative positions of the edges of two articles being welded, with slide blocks and jets. This is done according to the invention, such that the electroslag process is performed after the prelimiary single-side back welding and the seam is formed by single slide block.
FIG. 6 is a top schematic view showing the relative positions of the edges of two articles being welded, with slide blocks and jets. This is done according to the invention, such that the electroslag process is performed after the preliminary single-side back welding and the seam is formed by single slide block.

A maximum heaing temperature distribution curve 8 and a cooling rate distribution curve 9, along the zone subject to the heating effect, characteristic for the above mentioned method of electroslag welding are presented in FIG. 4.

Application of preliminary single-side partial welding during electroslag welding of circular butt ends has long been used in the petroleum industry. It can be effected by means of automatic submerged arc welding, automatic inert-gas shielded welding or by other similar welding methods. The number of backing welds 10 (FIG. 6) in automatic welding should be sufficient to preclude hole burning in the base metal when the weld 3 is formed by electroslag welding.

Figure 7:
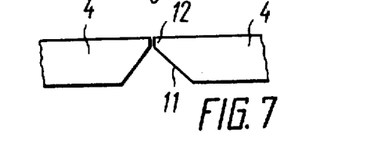
FIG. 7 is a schematic view showing the relative positions of the base metal edges before welding.

The edges of the base metal plates 4 intended for welding, are cut off to make a bevel 11 as shown in FIG. 7. Another version of bevelling is also possible. The bevel 11 in this case is made so that through the thickness of the base metal 4 a section 12 is left 5–7 mm thick to be used for preliminary backing by any of the known methods. After assembling the butt, the latter is given a preliminary double-side backing by making several the backing welds 10, if necessary. In the welding of circular butts, the backing welds 10 are located closer to the inner surface of the article. After the preliminary, backing welds the electroslag welding is performed such that seam 3 is formed at one side.

Regulation of the thermal cycle parameters in electroslag welding when the preliminary single-side backing weld is performed should be effected similar to the first version. Similarly, the total area of the cooled surface of welded joint is limited by the isotherm 5 corresponding to the maximum temperature $A_1$.

The area to be cooled is also divided into several sections which are cooled at different cooling rates. The cooling rate value (curve 9, FIG. 4) increases proportionately to the distance from the sections with the maximum heating temperature near the melting point towards the sections with the maximum temperature $A_1$. The boundaries of these sections are selected according to the above described principle. In addition the electroslag welding process is carried out in a similar way.

It should be noted that for a comparatively thin plate (for example in the order of 40 mm) of steel characterized by high hardenability it is possible to utilize single-side-cooling at the side of the backing weld 10.

The realization of the proposed method for regulating parameters of the thermal cycles in electroslag welding is shown by an example of the version which specifies preliminary backing run over the welded joint. Efficiency of the method has been checked with respect to normalized steels B/C=0.14; mn=1.1; Si=0.58; P=0.016; S=0.023 and CB/C=0.09; Mn=1.57; Si=0.57; P≈0.023; S=0.032 40 mm thick.

Small thickness of steel has permitted the use of a single-side cooling system for the welded joint. A water-air mixture was used for the cooling purpose.

The welding conditions and cooling parameters are given in Table 1. Application of the accompanying cooling according to the elaborated technique allows substantial changes to be introduced into the values of the main parameters of the thermal cycle in electroslag welding.

Figure 8:
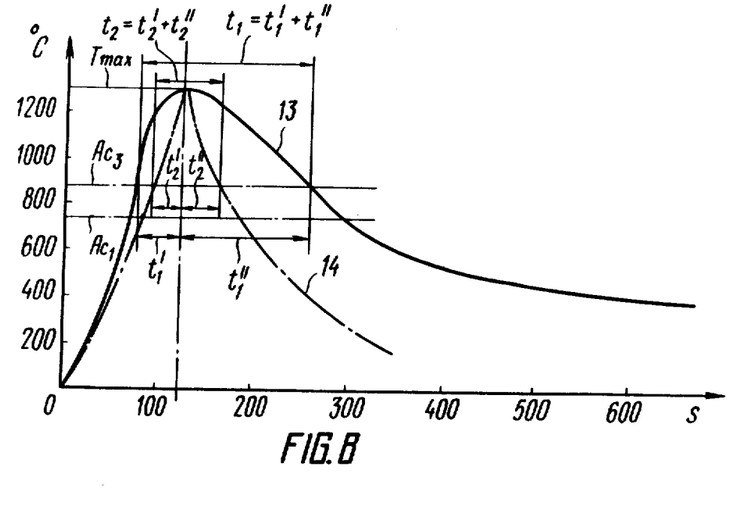
FIG. 8 presents the thermal cycle curves of the electroslag process carried out according to the commonly used and the proposed technique.
Figures 9, 10, 11, 12:
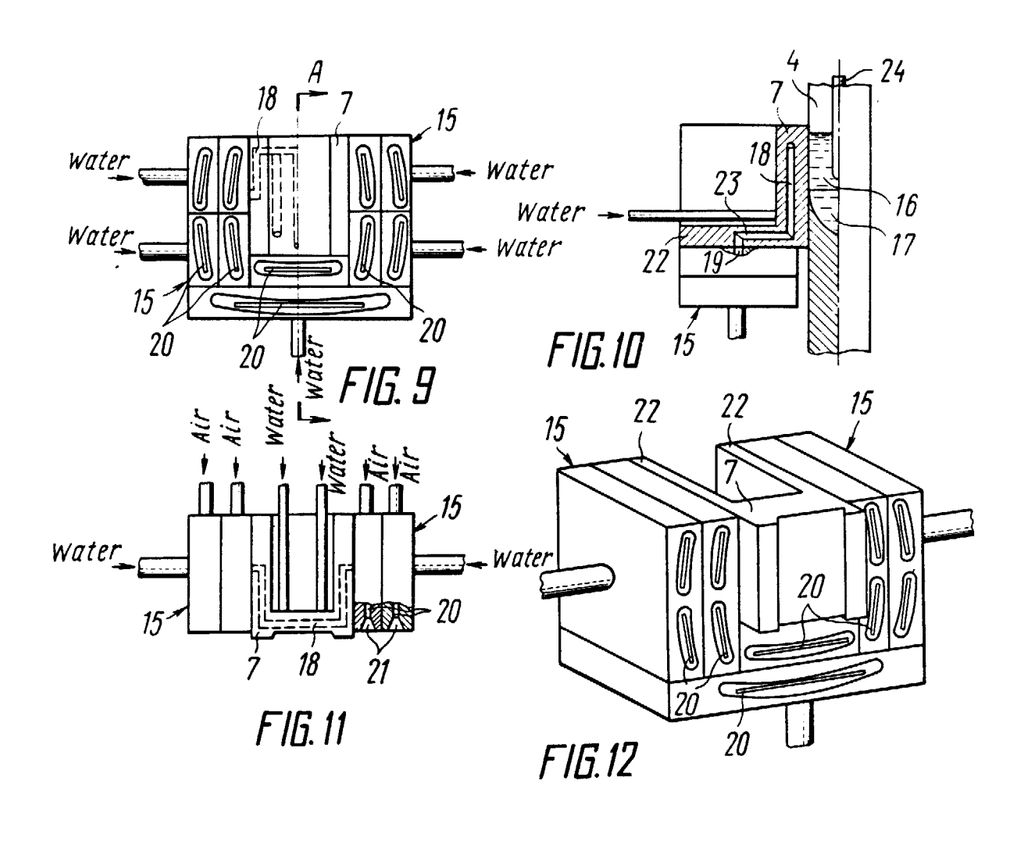
FIG. 9 is a front view of the device for the proposed method of regulating the parameters of the thermal cycles in electroslag welding.
FIG. 10 is a side view of the device for the proposed method of regulating the parameters of the thermal cycles in electroslag welding.
FIG. 11 is a top view of the device for the proposed method of regulating the parameters of the thermal cycles in electroslag welding.
FIG. 12 is an axonometrical view of the device for the proposed method of regulating parameters of the thermal cycles in electroslag welding.

FIG. 8 compares the thermal cycles of the seam-adjacent section (Tmax 1300° C.) obtained during electroslag welding of 40 mm thick steel by using the conventional (curve 13) and the proposed (curve 14) techniques for welding 40 mm thick steel.

The conventional technique in this case means electroslag welding without regulating the thermal cycle parameters.

In FIG. 8, plotted on X-axis is time in seconds, on Y-axis—temperature in °C.

The graph in FIG. 8 shows the electroslag welding with regulation of the thermal cycles as compared with the conventional technique. The graph shows the heating rate ($W_h$) within the interval of temperatures $A_3$-T being increased from 8° to 12° C./s; the duration of keeping the temperature higher than $A_3$ is reduced at heating from 45 ($t_1'$) down to 35 s ($t_2'$), at the cooling from 140 ($t_1''$) down to 42 s ($t_2''$); cooling rate W within the interval of austenite minimum stability temperatures (600°–500° C.) is increased ten times to be eual to 7°–8° C./s.

The results of testing the mechanical properties of welded joints of steel B after carrying out electroslag welding with the thermal cycle regulation as compared with the conventional technique are revealed in Table 2.

When welded by the conventional technique, the seam-adjacent section and the welding seam after being tested at subzero temperatures reveal a substantially lower value of resilience than standard values of the base metal.

When welded with thermal cycle regulation, a resilience value of the seam-adjacent section and the seam metal is higher than standard values of the base metal at all testing temperatures.

Structural investigation into the seam-adjacent section of the zone subject to the heating effect in steel B after performing the conventional electroslag welding technique reveals that the structure is of a coarse-grain character with a coarse ferrite lattice over grain boundaries.

Any alteration of the thermal dydle parameters in welding with an accompanying cooling leads to the almost complete suppression of any liberation of excessive ferrite over austenite grain boundaries and also leads to a higher content of perlite and bainite in the structure of steel B.

Similar changes are observed in the seam metal structure.

The above cited results have been proved by investigations into the structure and mechanical properties of welded joints from low-alloy normalized steel C.

Thus, realization of the proposed method for regulating the parameters of the thermal cycles in electroslag welding opens the way to obtain the required combination of mechanical properties without subsequent normalizing of welded joints.

The method according to the invention is carried into effect by means of a device illustrated schematically in FIGS. 8, 9, 10, 11, 12.

The device for realizing the method for regulating the thermal cycle parameters in electroslag welding is actually a welding-seam forming slide block 7 (FIGS. 2, 3, 5, 6, 9–12) carring jets 15 for spraying cooling liquid.

The formation of the welding seam 3 is effected at both sides over the thickness of the base metal 4 of an article being welded, two slide blocks 7 are used opposite to each other. The slide blocks 7 are intended for retaining a slag bath 16 (FIGS. 2, 5, 10) and a metal bath 17 and for forming the welding seam 3.

A body of the slide blocks 7 has passages 18 for bringing in cooling medium. The slide blocks 7 are connected with a drive (not shown) for their progressive displacement. The side and bottom surfaces of the slide block carry jets 15. These jets 15 are slit type. Made in the body of the jets 15 are passages 19 for the delivery of cooling medium into jets 15, the passages communicating with slits 20 intended for spraying the cooling medium. Each slit 20 at the side facing the surface of the base metal 4 being cooled is fitted with a nozzle 21 for distributing the cooling medium over the surface of the welded joint being cooled.

The spraying nozzles 21 are so constructed that the cooling medium discharged from these nozzles 21 cools the entire area of metal sections of the seam 3 and the zone subject to the heating effect, limited by the isotherms of maximum heating temperatures within the interval of temperature up to the temperature $A_1$ close to the melting temperature.

A discharge hole in the spraying nozzles 21 corresponds to that of the maximum heating temperature isotherms. This shaping of the spraying nozzles 21 promotes better distribution of the cooling medium over the entire area of the surface being cooled.

The number and dimensions of the jets 15 are determined by the size of the area being cooled and by the number of sections of different cooling rates provided.

As has been stated previously, for easy realization of this method, the surface cooled has been divided into two sections limited by the maximum heating temperature isotherms within the interval of T–A$_3$ and A$_3$–A$_1$. Therefore, each side and bottom face of the slide block 7 has two rows of the jets 15. The jets 15 located in a first row as to the face of the slide block 7 cool the area limited by isotherms T–A$_3$. The jets 15 of a second row cool the area limited by the isotherms 6–5 (FIGS. 2, 5) A$_3$–A$_3$.

Other than that, as has been stated previously there should be provided different cooling rates relative to the different temperature intervals of structural transformations over the section of similar heating temperature. With that end in mind, the jets 15 located on the side faces of the slide block 7 are divided into two groups in the direction of motion of the slide block 7.

The first group of the jets 15 located at a top portion of the slide block 7 create the required cooling rates within the interval of structurally free ferrite liberation temperatures. The second group of the jets 15 located directly after the first one creates the required cooling rates within the interval of minimum austenite stability temperatures.

Bosses 22 of rectangular shape are provided to attach the jets 15 to the side and bottom faces of the slide block 7. The bosses 22 have passages 23 (FIG. 10) for communication of the cooling medium delivery passages 18 and 19 in the slide block and jets.

The electroslag welding process with the thermal cycle regulation is carried into effect as follows. The slag bath 16 (FIGS. 2, 5, 10) is created by the liquefaction of granulated flux which fills the space between the edges of the base metal 4 and slide blocks 7 which are tightly pressed aganst the surface of an article being welded. The flux is melted with the help of an arc generated at the initial period of welding between the base metal 4 and an electrode wire 24. Upon melting down of a definite amount of flux, the arc is shunted with molten flux and dies out.

The heat liberated by the slag melts the edges of the base metal 4 and electrode wire 24 which is fed into the slag bath 16 at a speed equal to its melting rate. Molten electrode metal and base metal flow down to the bottom of the slag bath, thus forming a metal bath 17. As the heating source is being gradually removed, crystallization of metal in the metal bath 17 takes place.

To regulate the parameters of the thermal cycle in the electroslag process and consequently to control properties of welded joints, the cooling device (a set of the slit type jets 15) is arranged on the side faces of the slide block 7. The cooling medium is brought to the jets by means of water and air hoses (pipes) and through slits 20 is discharged into the metal. Its flow rate is monitored by special instruments (such as flow meters, pressure gauges). The device for regulating the thermal cycle parameters starts operating simultaneously with the system by moving the slide block 7 over the article to be welded. Regulation of the thermal cycle parameters is effected during the entire duration of the welding process.

The cooling medium is actually a water and air mix. Air is brought into the jets 15 at a pressure of 3–5 kG/cm$^2$, here it is mixed with water into a finely dispersed mix and also assists in atomization of water over the surface being cooled.

Water and air are fed through separate hoses through passages 19 for the delivery of the cooling medium to the jets. They flow through the passages 19 into the jets 15 where water and air are mixed into a finely dispersed mixture. This mix flows through the slits 20 to reach the spraying nozzles 21 of the jets 15 and, directly from them, is sprayed over the area of the welded joint subject to cooling.

The required values of cooling rates can be obtained by several methods. For example, it is possible to regulate the flow rate of cooling medium delivered to the jets 15. An increase in the flow rate of the cooling medium increases the intensity of heat dissipation and, thus contributes to a higher cooling rate.

It is possible to use a cooling medium with variable heat transfer coefficient. In this case only one cooling medium need be utilized but being of different initial temperature. In the device of the instant invention this condition is put into effect as follows.

To produce cooling medium to be delivered into the jets 15, water is used which has been passed through the slide blocks 7 and thus heated to a temperature of 30°–40° C. For this purpose the device has the slideblock cooling-medium delivery passages 18 connected with the passages 19 of an upper jet in the first group of the row closest to the slide block 7 through the passages 23 made in the bosses 22 of the slide block 7. This allows different cooling rates to be obtained both for different temperature intervals of structural transformations in the sections of similar maximum heating temperature and for the sections of the zone subject to the heating effect at different maximum heating temperatures.

Thus, as a result of the application of the proposed device, electroslag welding opens the way for ensuring the optimal predetermined thermal cycle parameters for each actual section of the zone subject to the heating effect and these parameters assist in the formation of structures with a favourable combination of mechanical properties.

Table 1

| | | Welding conditions | | | | | Cooling parameters | | |
| | | | | Welding wire feeding speed, m/h | Welding speed, m/h | Welding wire dia, mm | Air pressure, kg/cm$^2$ | Flow rate through single jet | |
| No. | Welding method | Current, A | Voltage, V | | | | | Water, lit/min | Air, m$^3$/min |
| 1 | Automatic submerged arc welding | | | | | | | | |
| | (a) 1st pass | 600–500 | 32–34 | 52 | 18.5 | 5 | — | — | — |
| | (b) 2nd pass | 900–950 | 34–36 | 74 | 18.5 | 5 | — | — | — |
| | (c) 3d pass | 1200–1250 | 38–40 | 103 | 18.5 | 5 | — | — | — |
| 2 | Electroslag | | | | | | | | |

Table 1-continued

| | | Welding conditions | | | | | Cooling parameters | | |
|---|---|---|---|---|---|---|---|---|---|
| | | | | Welding | | | | Flow rate through single jet | |
| No. | Welding method | Current, A | Voltage, V | wire feeding speed, m/h | Welding speed, m/h | Welding wire dia, mm | Air pressure, kg/cm² | Water, lit/min | Air, m³/min |
| | welding | 880-850 | 42-43 | 150 | — | 5 | 3-5 | 1.1-1.5 | 0.004 |

Table 2

| | | | | | Mechanical properties of welded joints | | | | | |
|---|---|---|---|---|---|---|---|---|---|---|
| | | | Ultimate strength, kg/mm² | Bending angle, deg. | Resilience in kg.m/cm² at testing temperatures in °C | | | | | |
| No. | Steel | Welding technique | | | Location tested | +20 | −20 | −40 | −60 | −70 |
| 1 | A | Conventional | 53 | 125 | seam centre | 15.5 | | 1.8 | | 1.7 |
| | | | | | seam-adjacent zone | 11.8 | | 1.5 | | 1.0 |
| | | With thermal cycle regulation | | | seam-centre | 14.5 | | 11.1 | | 2.4 |
| | | | | | seam-adjacent zone | 14.5 | | 10.2 | | 3.4 |
| | B | Conventional | | | seam centre | 13.0 | 3.7 | 2.0 | — | 1.3 |
| | | | | | seam-adjacent zone | 7.7 | 2.8 | 1.7 | — | 0.8 |
| | | With thermal | 62 | 125 | seam centre | 15.2 | 13.7 | 9.3 | — | 7.3 |
| | | | | | seam-adjacent zone | 13.7 | 7.7 | 5.1 | | 4.3 |

| 1 | 2 | 3 | 4 | 5 | 6 | 7 | 8 | 9 | 10 | 11 |
|---|---|---|---|---|---|---|---|---|---|---|
| | | Minimum values of mechanical properties of welded joints to be obtained | At the level of base metal ultimate strength | 60 | | 5.0 | — | 2.5 | | 2.0 |

What we claim is:

1. A device for controlling thermal cycle parameters in electroslag welding, comprising a slide block with passages for delivery of the cooling liquid thereinto, a plurality of jets with passages for delivery of the cooling liquid, said jets being secured to the side and bottom faces of said slide block; jet passages for delivering cooling liquid communicating with slits for spraying cooling medium and each slit at a side facing the surface of a base metal being cooled being fitted with a nozzle for distributing cooling medium over the surface of the welded joint being cooled, said side and bottom faces of said block having bosses with passages for connecting passages of said slide block with said jet passages, said bosses securing said jets in place.

2. A method for controlling the parameters of thermal cycles during an electroslag welding operation, comprising the steps of cooling the entire area of the heated zone defined by isotherms of maximum heating temperatures in the range from temperatures close to the melting point to a predetermined maximum temperature, and accelerating the rate of cooling in a direction from an area of maximum heating temperature close to the melting point to an area of said predetermined maximum temperature, spraying cooling medium through jets on side and bottom surfaces of a slide block, concentrating cooling medium on surface of weld seam, securing said jets in place by bosses, and feeding cooling medium to jets closest to the slide block.

3. A method for controlling the parameters of heating cycles during an electroslag welding operation as claimed in claim 2, wherein portions of the heated zone having an identical maximum heating temperature are cooled in the temperature range of liberation of structurally free ferrite at a rate precluding liberation of structurally free ferrite, and in the temperature range of the least austenitic stability at a rate permitting the austenite to disintegrate into a fine ferritic-perlite structure with a perlite content less than 30%, and a beinito-martensite structure for low-alloyed steels.

4. A device for controlling the parameters of a thermal cycle during an electroslag welding operation, comprising a slide block with passages for delivery of a cooling liquid thereinto, a plurality of jets with passages for delivery of a cooling liquid thereinto, said jets being secured to the side and bottom faces of said slide block; jet passages for delivering cooling liquid communicating with slits for spraying cooling medium and each slit at a side facing the surface of a base metal being cooled being fitted with a nozzle for distributing cooling medium over the surface of the welded joint being cooled.

5. A device for controlling the parameters of a thermal cycle during an electroslag welding operation as claimed in claim 4, wherein said slide block has side and bottom faces with bosses having passages communicating the passages of said slide block with the passages of said jets, said bosses securing said jet in place, said passages having slits and communicating with side faces of said slide block for varying cooling over individual parts of a zone exposed to heat.

* * * * *